United States Patent
Beals

(10) Patent No.: US 9,451,202 B2
(45) Date of Patent: Sep. 20, 2016

(54) CONTENT-BASED HIGHLIGHT RECORDING OF TELEVISION PROGRAMMING

(71) Applicant: EchoStar Technologies, LLC, Englewood, CO (US)

(72) Inventor: William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 181 days.

(21) Appl. No.: 13/754,722

(22) Filed: Jan. 30, 2013

(65) Prior Publication Data

US 2014/0186012 A1 Jul. 3, 2014

Related U.S. Application Data

(60) Provisional application No. 61/746,407, filed on Dec. 27, 2012.

(51) Int. Cl.

| | |
|---|---|
| *H04N 5/91* | (2006.01) |
| *H04N 5/782* | (2006.01) |
| *H04N 5/783* | (2006.01) |
| *H04N 21/426* | (2011.01) |
| *H04N 21/433* | (2011.01) |

(Continued)

(52) U.S. Cl.
CPC ............ *H04N 5/782* (2013.01); *H04N 5/783* (2013.01); *H04N 21/4263* (2013.01); *H04N 21/4334* (2013.01); *H04N 21/4532* (2013.01); *H04N 21/8455* (2013.01)

(58) Field of Classification Search
CPC .. H04N 21/4532; H04N 5/76; H04N 21/435; H04N 5/765; H04N 21/25891; H04N 21/44222; H04N 5/4401; H04N 21/4316; H04N 21/6582; G06F 17/30017; G06F 2203/04803; G06Q 30/0631; G11B 27/322
USPC .......... 725/38–47, 50, 34, 89; 386/230, 241, 386/248, 293, 291, 296, 297, 278, 290
See application file for complete search history.

(56) References Cited

U.S. PATENT DOCUMENTS

| | | | |
|---|---|---|---|
| 2005/0005308 A1* | 1/2005 | Logan ................... | G06Q 30/06 725/135 |
| 2005/0149965 A1* | 7/2005 | Neogi ................... | H04H 60/46 725/14 |
| 2007/0239856 A1* | 10/2007 | Abadir ................... | H04N 5/782 709/219 |

(Continued)

*Primary Examiner* — Thai Tran
*Assistant Examiner* — Stephen Smith
(74) *Attorney, Agent, or Firm* — Kilpatrick Townsend & Stockton LLP

(57) ABSTRACT

A media device for content-based highlight handling of television programming may be provided. Criteria of interest corresponding to user input may be processed. Idle tuner(s) not being used to receive any television channels for presentation or recording may be identified. A television channel identified based at least in part on the criteria of interest may be tuned to with an idle tuner. Content received at the media device may be processed. Update data associated with a subject matter of the content may be received separately from the television channel. A portion of the content that corresponds to the criteria may be identified based at least in part on the criteria of interest and the update data. A portion of a television program may be recorded and/or marked. The portion of the television program may correspond to the portion of the content identified based at least in part on the criteria.

21 Claims, 6 Drawing Sheets

(51) Int. Cl.
*H04N 21/45* (2011.01)
*H04N 21/845* (2011.01)

(56) References Cited

U.S. PATENT DOCUMENTS

| | | | | |
|---|---|---|---|---|
| 2008/0064490 A1* | 3/2008 | Ellis | H04N 5/44543 | 463/25 |
| 2008/0092168 A1* | 4/2008 | Logan | G06F 17/30265 | 725/44 |
| 2008/0155602 A1* | 6/2008 | Collet | H04N 21/235 | 725/46 |
| 2008/0178219 A1* | 7/2008 | Grannan | H04N 7/163 | 725/41 |
| 2009/0080857 A1* | 3/2009 | St. John-Larkin | H04N 5/7755 | 386/296 |
| 2010/0251304 A1* | 9/2010 | Donoghue | H04N 5/44543 | 725/46 |
| 2011/0217024 A1* | 9/2011 | Schlieski | G11B 27/00 | 386/290 |
| 2012/0237182 A1* | 9/2012 | Eyer | H04N 5/783 | 386/241 |
| 2012/0263439 A1* | 10/2012 | Lassman | H04N 5/76 | 386/280 |
| 2013/0042179 A1* | 2/2013 | Cormack | G11B 27/3027 | 715/723 |
| 2013/0138435 A1* | 5/2013 | Weber | G06F 17/21 | 704/231 |
| 2013/0160051 A1* | 6/2013 | Armstrong | H04N 21/454 | 725/34 |
| 2013/0268620 A1* | 10/2013 | Osminer | H04N 21/251 | 709/217 |
| 2014/0023348 A1* | 1/2014 | O'Kelly | G11B 27/031 | 386/278 |
| 2014/0082670 A1* | 3/2014 | Papish | H04N 21/4532 | 725/45 |
| 2014/0223479 A1* | 8/2014 | Krishnamoorthi | H04L 12/189 | 725/39 |

\* cited by examiner

CONTENT-BASED HIGHLIGHT RECORDING OF TELEVISION PROGRAMMING

CROSS-REFERENCE TO RELATED APPLICATION

This application claims the benefit of U.S. Provisional Application No. 61/746,407, filed Dec. 27, 2012, and titled "CONTENT-BASED HIGHLIGHT RECORDING OF TELEVISION PROGRAMMING," the entire contents of which are hereby incorporated by reference for all purposes.

TECHNICAL FIELD

This disclosure relates to apparatus and methods of content display, and particularly to content-based highlight recording of television programming.

BACKGROUND

A person watching television may have access to a large selection of television programming. Such television programming may be available across multiple channels and may include scheduled programming and on-demand programming. An electronic programming guide (EPG) may be used to view current and upcoming television programming. In addition, various devices exist that can be used to receive and record television programs. In recent times, devices known as personal video recorders (PVRs) or digital video recorders (DVRs) have become commonplace. PVRs/DVRs use a hard drive to record digital data that represents a television program. Various optical media and other forms of memory can be used to record television programs or digital representations thereof.

A user of such television programming equipment can encounter a number of difficulties in managing television programming. A user may be more interested, or solely interested, in one or more portions of certain programs, rather than being interested in viewing the entireties of the programs. If a user finds a particular program that may contain certain portions of interest, the user may have no choice but to watch the entire program, waiting for the portions of interest, and/or set the program to be recorded. With a recorded program, a user may not know when a portion of interest is to occur during the program, if at all. For example, a user may only be interested in viewing scoring plays leading to touchdowns in a particular football game. The user must spend time and effort searching for particular portions of interest within the recorded program. Typically, a viewer is able access different portions of a recorded program by scrolling forward or backward through the program stream, or by specifying a time to jump to in the stream. Such linear navigation and searching is time-consuming and can involve an unacceptable amount of trial and error.

Thus, there is a need for television programming management that addresses one or more of the foregoing problems in a convenient manner for a user. These and other needs are addressed by the present disclosure.

SUMMARY

Various methods, systems, and apparatus are disclosed for implementing a set-top box for content-based highlight recording of television programming.

In one aspect, a media device may be configured for content-based highlight handling of television programming. The media device may include one or more processors and one or more storage devices coupled to the one or more processors, configured to store instructions to cause the one or more processors to: process one or more criteria of interest corresponding to user input; identify one or more idle tuners of the media device that are not being used to receive any television channels for presentation or recording; tune with a tuner selected from the one or more idle tuners of the media device to a first television channel identified based at least in part on the one or more criteria of interest; process content received at the media device; receive update data associated with a subject matter of the content, wherein the update data is received separately from the first television channel; identify, based at least in part on the one or more criteria of interest and the update data, a portion of the content that corresponds to the one or more criteria of interest; and cause a portion of a television program to be recorded and/or marked, wherein the portion of the television program corresponds to the portion of the content identified based at least in part on the one or more criteria of interest.

In another aspect, a method for content-based highlight handling of television programming is provided. One or more criteria of interest corresponding to user input may be processed via a media device. One or more idle tuners of the media device that are not being used to receive any television channels for presentation or recording may be identified via the media device. A first television channel may be identified based at least in part on the one or more criteria of interest and may be tuned to with a tuner selected from the one or more idle tuners of the media device. Content received at the media device may be processed via the media device. Update data associated with a subject matter of the content separately from the first television channel may be processed via the media device. The update data may include a score change of a sporting event associated with the content. A portion of the content that corresponds to the one or more criteria of interest may be identified via the media device and based at least in part on the one or more criteria of interest and the update data. A portion of a television program may be caused, via the media device, to be recorded and/or marked. The portion of the television program may correspond to the portion of the content identified based at least in part on the one or more criteria of interest.

In yet another aspect, a media device may be configured for content-based highlight handling of television programming. The media device may include one or more storage devices and one or more processors operable to: process one or more criteria of interest corresponding to user input; identify one or more idle tuners of the media device that are not being used to receive any television channels for presentation or recording; tune with a tuner selected from the one or more idle tuners of the media device to a first television channel identified based at least in part on the one or more criteria of interest; process content received at the media device to identify at least one graphical object included in the content; identify, based at least in part on the one or more criteria of interest, a portion of the content that corresponds to the one or more criteria of interest and the graphical object; and cause a portion of a television program to be recorded and/or marked, wherein the portion of the television program corresponds to the portion of the content identified based at least in part on the one or more criteria of interest.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures in conjunction with the description of certain embodiments presented herein. However, the appended figures should not be seen as limiting or defining the present disclosure.

Figure 1:
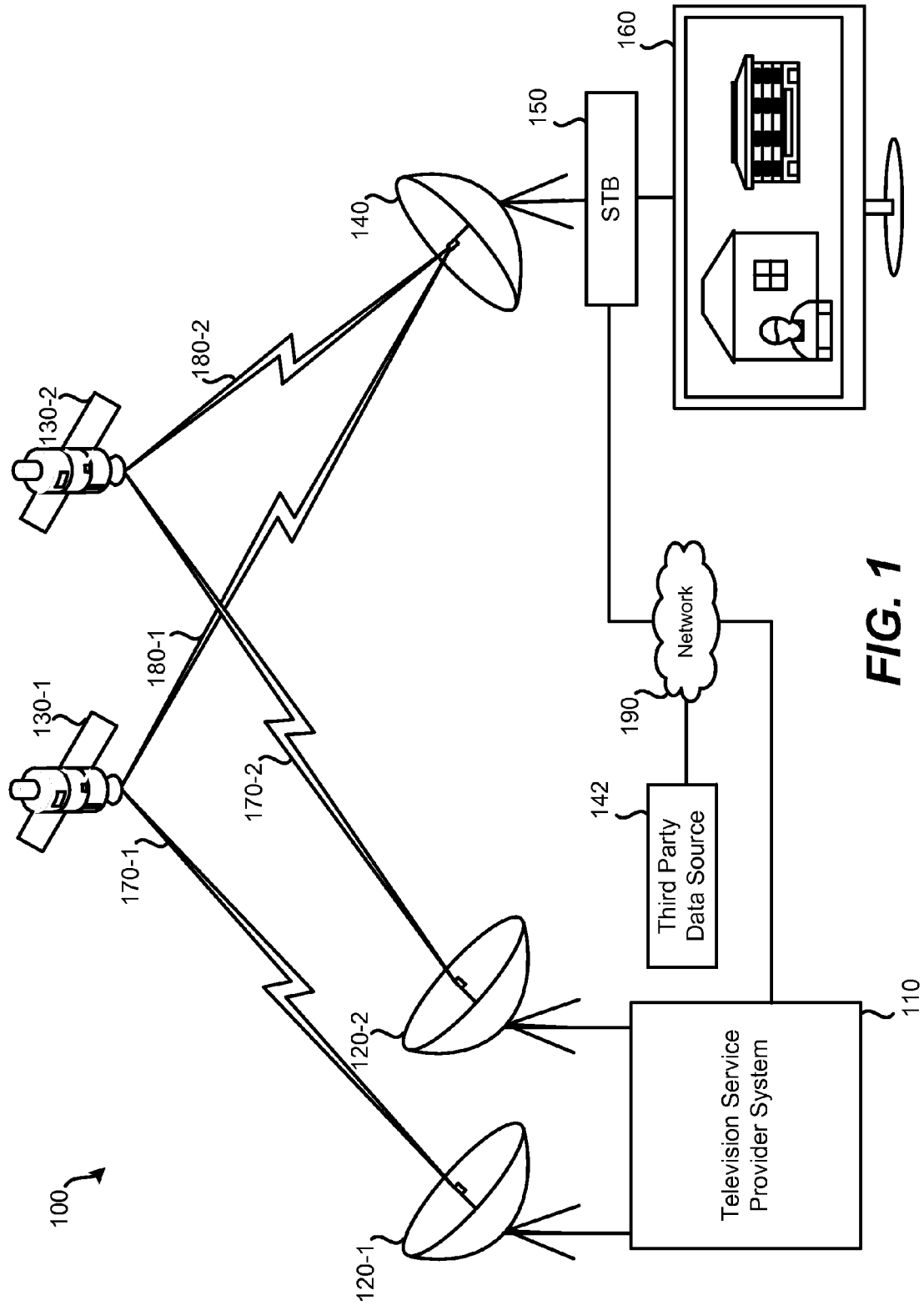
FIG. 1 illustrates a satellite television distribution system, in accordance with certain embodiments of the present disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Although embodiments detailed herein may be directed toward controlling television-based equipment, the principles easily can be extended to other types of content and devices, such as computer equipment, handheld electronic devices, and the like. In addition, the terms "television" or "television service" can include traditional television programming, such as linear television programs, as well as other types of audio, video and/or audio/video content, such as on-demand video content, streaming video content and the like delivered via any type of content delivery systems, such as a cable, satellite, cellular/wireless, Internet/IP and/or any other content delivery technology or system currently known or hereafter developed. Furthermore, embodiments herein describe set-top boxes and/or other devices being connected with a television or other device having an electronic display. However, features disclosed herein can also be incorporated into the device having the electronic display, such as a television with an integrated cable, satellite or IPTV receiver.

Various methods, systems, and computer products are disclosed for content-based highlight recording of television programming, which may include score-based content highlight recording. Certain embodiments according to the present disclosure may provide for the automatic identification and recording of one or more program portions of interest. It may be desirable for a set-top box to identify, record, compile, and/or store portions of interest from one or more programs. For example, a user may be generally interested in a particular football game, but only interested in watching certain highlights. The user may be interested in viewing highlights such as scoring plays leading to touchdowns, game-changing plays such as interceptions, and/or the like. Thus, a user may have the ability to create a customized sports highlight summary of an event. With certain embodiments, the highlights summary may primarily include content surrounding score change(s).

Certain embodiments according to the present disclosure may provide for using multiple tuners and decoders in a television tuning system to provide content-based highlight recording. Since multiple tuners may be present in a set-top box, there may be periods of time when at least some of the television tuners and decoding resources are unused. For example, if only one person in a household is watching television and nothing is being recorded via the set-top box's DVR, only a single tuner and little of the decoding resources are used. As such, multiple tuners and decoding resources of the set-top box may be idle. Rather than remaining idle, these tuners and decoding resources may be used to tune to and, possibly, decode television channels that are identified as possibly containing highlights of interest.

Certain embodiments may allow for a user to indicate criteria for events of interest in one or more programs to be recorded. As one example, for an hour-long news broadcast, a user may only want to know about weather, which may be a small percentage of the hour. The user may specify the subject matter of interest as being weather, and only the portion(s) dealing with weather may contained in the final recording available to the viewer. Accordingly, certain embodiments stand to save the user a significant amount to time and effort, while providing the user with more content of interest.

Certain embodiments may automatically compile a collage of highlights from different programs. For example, a user may specify an interest in certain events in televised football programs on a fall Sunday. The user could specify an interest in all scoring plays, interceptions, quarterback sacks, and gains of 30 yards or more that might occur in the games. The result would be a compilation of segments from the games that contain those events which the user really cares to watch. As another example, say a user is interested in how the top three cable news programs treat a particular issue during the primetime hour broadcasts. Certain embodiments may allow for the pulling everything interesting (i.e., pertinent to that particular issue) from on all three of those broadcasts for that hour into a new recording (e.g., a "highlight reel"), allowing the user to have captured the pertinent portions for comparison, if desirable.

Various embodiments may provide for various ways to specify events for recording. In some embodiments, the criteria that the user may specify for events and/or programs of interest may include, for example without limitation, one or more of descriptive program information, program time information, one or more key words, channel information, host information, guest information, actor information, character information, action information, ordering information, priority information, and/or the like. Certain embodiments may provide one or more user-selectable options to select one or more events of interest to be recorded. The user-selectable options could be directed to any of the foregoing criteria.

In various embodiments, the identification of content of interest may be based at least in part on audio triggers, metadata triggers, video triggers, and/or the like. Some embodiments may monitor closed caption information in view of criteria for content of interest. For example, if a touchdown correspond to an event of interest in a football game, the closed caption information for the game may be monitored for instances of the keyword, "touchdown." Accordingly, some embodiments may look for cues in the closed caption information that indicate an event of interest. Some embodiments could employ OCR (optical character recognition) of a known location to monitor for cues, such as score changes. Some embodiments could employ facial recognition techniques to identify one or more individuals as triggers for recording. Some embodiments may trigger off audio tracks, third party references, and/or any suitable basis. With certain embodiments, no additional information would be required to be sent with the content.

FIG. 1 illustrates an embodiment of a satellite television distribution system 100. Satellite television distribution system 100 may include: television service provider system 110, satellite transmitter equipment 120, satellites 130, satellite dish 140, set-top box 150, and television 160. Alternate embodiments of satellite television distribution system 100 may include fewer or greater numbers of components. While only one satellite dish 140, set-top box 150, and television 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
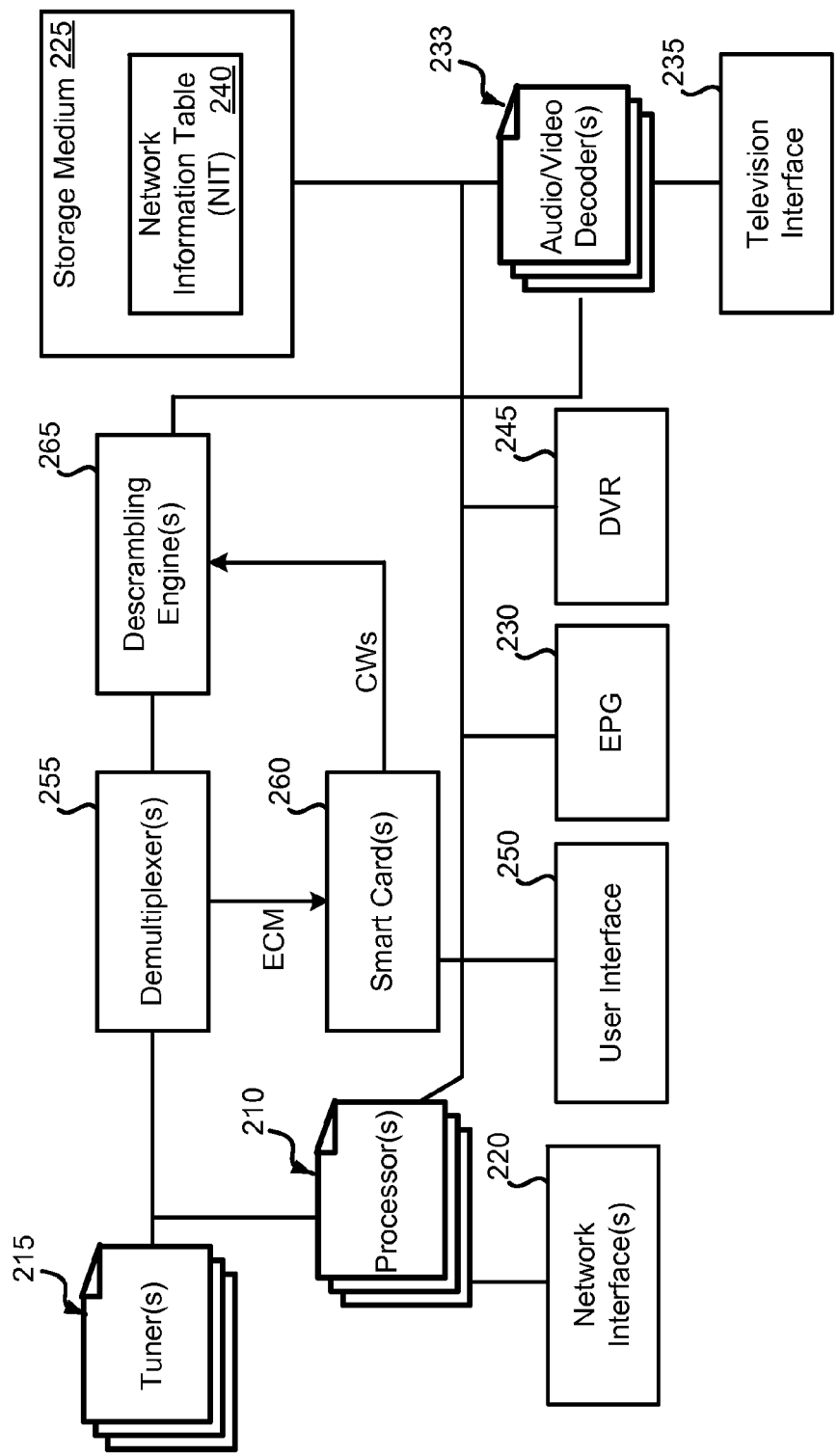
FIG. 2 illustrates a simplified diagram of a set-top box, in accordance with certain embodiments of the present disclosure.

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional detail of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170-1 represents a signal between satellite uplink 120 and satellite 130-1. Uplink signal 170-2 represents a signal between satellite uplink 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal path between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. For clarity, it should be noted that satellites carry many transponders, and transponders may carry a single multiplexed transport stream containing many PIDs. A service consists of one or more PIDs for audio, video, and data on that multiplexed transport stream.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. STB 150 may decode the received transponder stream. As such, depending on which television channel(s) are desired, a transponder stream from a different satellite (or a different transponder of the same satellite) may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190. In some embodiments, STB 150 may be communicatively coupled via the network 190 with one or more third party data sources 142. The one or more third party data sources 142 may provide third party reference data, which will be discussed further herein.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates a block diagram of an embodiment of a set-top box 200. STB 200 may be set-top box 150 of FIG. 1, or may be incorporated as part of a television, such as television 160 of FIG. 1. STB 200 may include: processors 210, tuners 215, network interfaces 220, non-transitory computer-readable storage medium 225, electronic programming guide (EPG) 230, television interface 235, networking information table (NIT) 240, digital video recorder (DVR) 245, user interface 250, demultiplexer 255, smart card 260, and/or descrambling engine 265. In other embodiments of STB 200, smaller or greater numbers of components may be present. Various embodiments of STB 200 may include any suitable number of tuners 215 and attendant components, such as decoders 233, to facilitate various features disclosed herein. For example, various embodiments may include up to eight or more—any suitable number—of tuners 215 to facilitate embodiments of the present disclosure. It should be understood that the various components of STB 200 may be implemented using hardware, firmware, software, and/or some combination thereof. For example, EPG 230 may include software instructions to be executed by processors 210.

Processors 210 may include one or more general-purpose processors configured to perform processes such as commanding a tuner, demodulator, demultiplexer, descrambling engine, and audio video decoders to tune to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by processor 210 in some embodiments. In some embodiments, functions performed by various modules such as descrambling engine 265 may be performed using one or more dedicated processors.

Tuners 215 may include one or more tuners used to facilitate tuning to television channels, such as television channels transmitted via satellite or cable. Each tuner contained in tuners 215 may be capable of receiving and processing one or more streams of data from a satellite transponder (or a cable RF channel) at a given time. As such, a single tuner may tune to one transponder (or cable RF channel). If tuners 215 include multiple tuners, one tuner may be used to tune to a television channel on a first transponder for display using a television, while one or more tuners of the set-top box may be identified that are idle. For example, if the set-top box has four tuners, the three tuners not being used to tune to the first television channel may be idle. An idle tuner may be defined as a tuner that is not being used to receive a transponder stream for presentation of a television channel via a presentation device or for recording of a television channel. An idle tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording in some embodiments. Additionally or alternatively, the availability of audio/video decoding resources may be determined. For example, the number of audio/video decoder submodules 233 that are idle may be determined. An audio/video decoder submodule may be defined as idle when the audio/video decoder submodule is not being used to decode video and/or audio received from a DVR or descrambling engine.

Network interface(s) 220 may be used to communicate via an alternate communication channel with a television service provider. For example, the primary communication channel may be via satellite (which may be unidirectional to the STB) and the alternate communication channel (which may be bidirectional) may be via a network, such as the Internet. Network interface(s) 220 may include a modem interface, as a STB may include a modem in some embodiments, as well other interfaces described herein. Referring back to FIG. 1, STB 150 may be able to communicate with television service provider system 110 via a network, such as the Internet. This communication may be bidirectional: data may be transmitted from STB 150 to television service provider system 110 and from television service provider system 110 to STB 150. Referring back to FIG. 2, network interface 220 may be configured to communicate via one or more networks, such as the Internet, to communicate with television service provider system 110 of FIG. 1 and other information sources. Information may be transmitted and/or received via network interface(s) 220.

Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, NIT 240, and/or DVR 245. DVR 245 may include software instructions, stored on the storage medium 225, to be executed by the processor(s) in order to provide DVR functions. Additionally, recorded television programs may be stored using storage medium 225.

EPG 230 may include software instructions to be executed by the processor(s) in order to provide EPG functions and rendering of data. EPG 230 may store information related to television channels and the timing of programs appearing on such television channels. In some embodiments, EPG 230, including software instructions and EPG data, may be stored using non-transitory storage medium 225, which may be a hard drive. EPG 230 may be used to inform users of what television channels or programs are popular and/or provide recommendations to the user. EPG 230 may provide the user with a visual interface displayed by a television that allows a user to browse and select television channels and/or television programs for viewing and/or recording via DVR 245. Information used to populate EPG 230 may be received via network interface 220 and/or via satellites, such as satellites 130 of FIG. 1 via tuners 215. For instance, updates to EPG 230 may be received periodically via satellite. EPG 230 may serve as an interface for a user to control DVR 245 to enable viewing and/or recording of multiple television channels simultaneously.

One or more audio/video decoders 233 may serve to convert encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video and audio into a format appropriate to be displayed by a television or other form of display device and audio into a format appropriate to be output from speakers, respectively. The number of audio/video decoders 233 may or may not correspond to the number of tuners 215 in certain embodiments.

Television interface 235 may serve to output a signal to a television (or another form of display device) in a proper format for display of video and playback of audio. As such, television interface 235 may output one or more television channels, stored television programming from storage medium 225 (e.g., DVR 245 and/or information from EPG 230) to a television for presentation.

The network information table (NIT) 240 may store information used by set-top box 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by STB 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to lookup the audio PIDs and video PIDs in another table.

Table 1 provides a simplified example of NIT 240 for several television channels. It should be understood that in other embodiments, many more television channels may be represented in NIT 240. NIT 240 is periodically updated by a television service provider. As such, television channels may be reassigned to different satellites and/or transponders, and STB 200 may be able to handle this reassignment as long as NIT 240 is updated.

TABLE 1

| Channel | Satellite | Transponder | ECM PID | Audio PIDs | Video PID |
| --- | --- | --- | --- | --- | --- |
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in NIT 240. Video and/or audio for different television channels on different transponders may have the same PIDs. Such television channels may be differentiated based on which satellite and/or transponder to which a tuner is tuned.

Digital Video Recorder (DVR) 245 may include software instructions and/or data stored on storage medium 225. DVR 245 permit a television channel to be recorded for a period of time. DVR 245 may store timers that are used by processors 210 to determine when a television channel should be tuned to and recorded to DVR 245 of storage medium 225. In some embodiments, a limited amount of storage medium 225 may be devoted to DVR 245. Timers may be set by the television service provider and/or one or more users of the STB. DVR 245 may be configured by a user to record particular television programs. Whether a user directly tunes to a television channel or DVR 245 tunes to a first television channel, NIT 240 may be used to determine the satellite, transponder, ECM PID (packet identifier), audio PID, and video PID.

User interface 250 may include a remote control (physically separate from STB 200) and/or one or more buttons on STB 200 that allows a user to interact with STB 200. User interface 250 may be used to select a television channel for viewing, view EPG 230, and/or program DVR 245.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which in combination with NIT 240, can be determined to be associated with particular television channel. Particular data packets, referred to as entitlement control messages (ECMs), may be periodically transmitted. ECMs may be encrypted; STB 200 may use smart card 260 to decrypt ECMs. Decryption of an ECM may only be possible if the user has authorization to access the particular television channel associated with the ECM. When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 2 seconds, may elapse before the control words indicated by the ECM can be obtained. Smart card 260 may be permanently part of STB 200 or may be configured to be inserted and removed from STB 200.

Demultiplexer 255 may be configured to filter data packets based on PIDs. For example, if a transponder data stream includes multiple television channels, data packets corresponding to a television channel that is not desired to be stored or displayed by the user, may be ignored by demultiplexer 255. As such, only data packets corresponding to the one or more television channels desired to be stored and/or displayed may be passed to either descrambling engine 265 or smart card 260; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to NIT 240, may be appropriately routed by demultiplexer 255. It should be understood that, in some embodiments, all peripherals may communicate with main memory (RAM)/DRAM when communicating with other components.

Descrambling engine 265 may use the control words output by smart card 260 in order to descramble video and/or audio corresponding to television channels for storage and/or presentation. Video and/or audio data contained in the transponder data stream received by tuners 215 may be scrambled. The video and/or audio may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (via DVR 245) and/or to audio/video decoder 233 for output to a television or other presentation equipment via television interface 235 or both.

For simplicity, STB 200 of FIG. 2 has been reduced to a block diagram, commonly known parts, such as a power supply, have been omitted. Further, some routing between the various modules of STB 200 has been illustrated. Such illustrations are for exemplary purposes only. Two modules not being directly or indirectly connected does not indicate the modules cannot communicate. Rather, connections between modules of the STB 200 are intended only to indicate possible common data routing. It should be understood that the modules of STB 200 may be combined into a smaller number of modules or divided into a greater number of modules. Further, the components of STB 200 may be part of another device, such as built into a television. Also, while STB 200 may be used to receive, store, and present television channels received via a satellite, it should be understood that similar components may be used to receive, store, and present television channels via a cable network.

Figure 3:
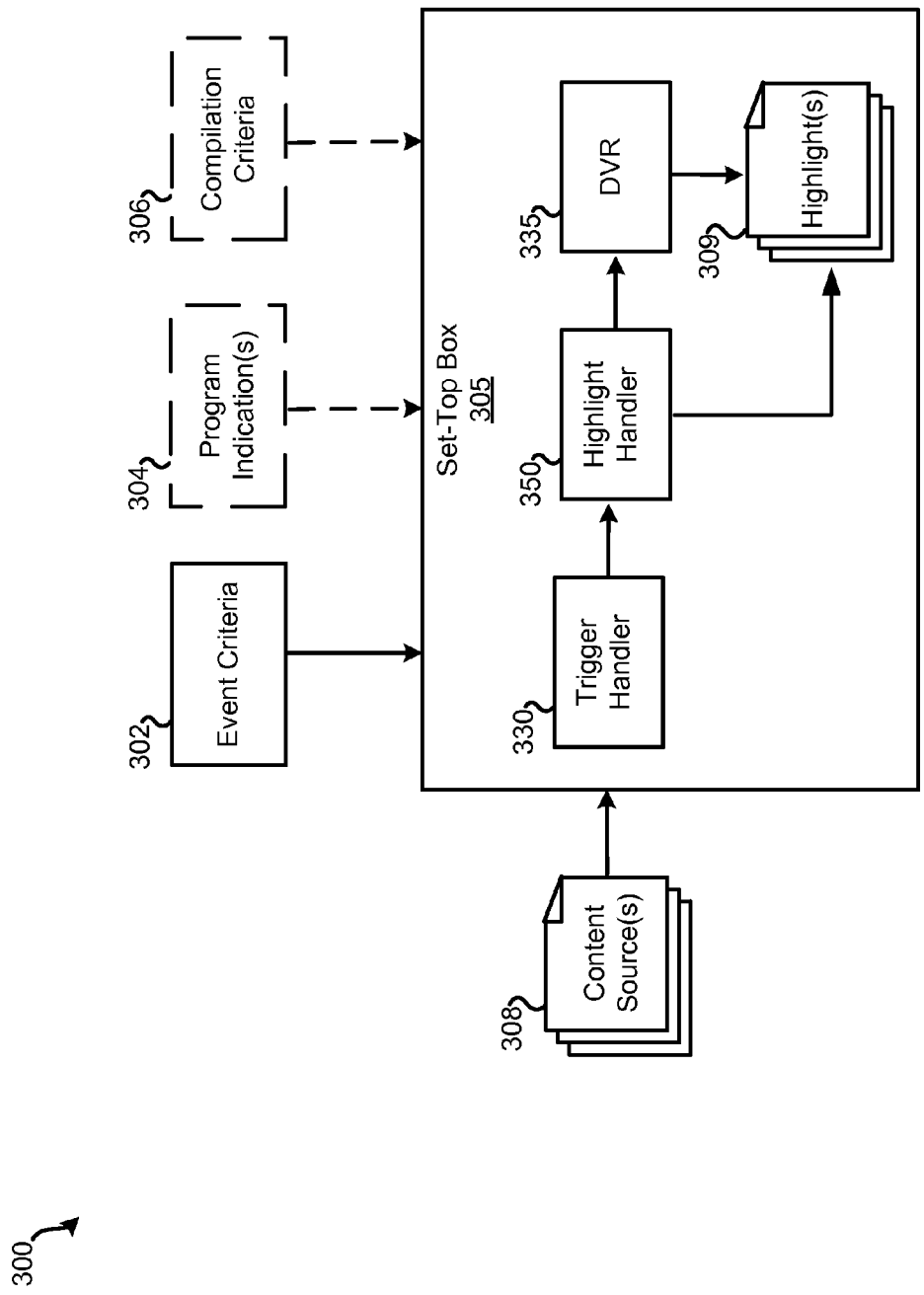
FIG. 3 illustrates a simplified content handling system, in accordance with certain embodiments of the present disclosure.

FIG. 3 is a simplified illustration of a content handling system 300, in accordance with certain embodiments of the present disclosure. The content handling system 300 may provide for content-triggered highlight recording of television programming. In certain embodiments, the content handling system 300 may be included in the end-user system, for example, with a set-top box 305, which may correspond to the set-top box 105 and/or the set-top box 200, for example. In certain embodiments, the content handling system 300 may be included in the television or other display device. In alternative embodiments, the content handling system 300 may be included in the television service provider system 110. The content handling system 300 could be separate from, and provide content to, the television service provider system 110.

The content handling system 300 may allow for a user to indicate criteria of interest for events in one or more programs to be recorded. The content handling system 300 may receive event criteria 302. Various embodiments may provide for various ways to specify the event criteria 302. In some embodiments, the event criteria 302 that the user may specify for events and/or programs of interest may include, for example without limitation, one or more of descriptive program information, program time information, one or more keywords, channel information, host information, guest information, actor information, character information, action information (such as touchdowns, interceptions, fumbles, quarterback sacks, etc.) and/or the like.

In some embodiments, the event criteria 302 may include a time window. For example, a user may indicate an amount of time surrounding a triggering event that the program should be recorded. Say a user wants to ensure that play preceding the scoring play is captured, as well as all the commentary, celebration, and replays following the scoring play. The user may accordingly specify a buffer of 1-2 minutes before and/or after the event, for example. Without a time window being specified by the user, any suitable default time window may be employed. In some embodiments, a window may be automatically determined based on other events surrounding the trigger event. For example, recording of a scoring play may cease when the beginning of the subsequent play is detected. However, it should be understood that in other embodiments, the entirety of one or more programs of interest may be recorded, and highlights within each program may be marked so that the user may directly skip to one highlight at a time. In some embodiments, the event criteria 302 may can be changed, with changes being reflected even after the program has been recorded.

One or more user-selectable options for the user to indicate the event criteria 302 may presented to the user. In various embodiments, the one or more user-selectable options may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, a remote control device, which could be a mobile computing device, a pointing device, a graphical user interface (GUI), movement-based selection, and/or any suitable navigation feature configured to communicate with the set-top box 305. In some embodiments, one or more user-selectable options may be displayed with the set-top box 305. For example, the set-top box 305 may be configured to provide one or more user-selectable options with a display device apart from the set-top box, but communicatively coupled to the set-top box device. For example, the set-top box 305 may be configured to display one or more user-selectable options with a television display/monitor 160 communicatively coupled to the set-top box 305. In some embodiments, one or more user-selectable options may be provided via a network interface, allowing a user to indicate the event criteria 302 remotely.

In various embodiments, the one or more user-selectable options may include one or more predetermined options tailored to particular types of programs and/or to particular programs. For example, in the case of the user selecting a particular football game from the EPG, the one or more user-selectable options may present the user with popular points of interest that user may select, such as scoring plays leading to touchdowns, game-changing plays such as interceptions, and/or the like. As another example, in the case of the user selecting a general category corresponding to football games, the one or more user-selectable options may present similar options. As a different example, in the case of the user selecting a news program or a category corresponding to news programs, the one or more user-selectable options may present the user with popular points of interest tailored to news, such as weather, sports, etc. Suggestions of popular points of interest such as the foregoing examples may be presented in addition to fields allowing the user to specify more customized criteria.

The content handling system 300 may allow for a user to indicate one or more programs 304 from which highlights may be extracted. In some embodiments, the program indicia 304 may specify a particular program. The user may indicate a particular program or programs of interest, for example, via the EPG. In some embodiments, the program indicia 304 may include a category or type of program or a program series. Thus, rather than indicating programs with particularity, the user could indicate a program category or type, for example, via a menu option. In some embodiments, the program indicia 304 may include one or more specified blocks of time. For example, a user may specify a block of time stretching from Sunday afternoon to Sunday evening. Thus, the user may generally indicate interest in football on a particular Sunday or all Sundays in a season, for example. Or, the user may generally indicate interest in a program series, for example.

In some embodiments, a program indication 304 may be optional. The event criteria 302 may be sufficient in some circumstances. For example, the event criteria 302 may specify a particular individual that may for example be the host of a television show, and also may make guest appearances on other television shows. The compilation of highlights based on the specification of that individual may capture each instances of the individual appearing on a show. In some embodiments, the event criteria 302 could further specify only portions programs where that individual is speaking.

In some embodiments, the content handling system 300 may allow for a user to indicate compilation criteria 306. The compilation criteria 306 may include any suitable information specifying how the highlights should be compiled. The compilation criteria 306 may include ordering/priority information, for example. A user may, for example, want to see all scoring plays of a football game before other highlights from the game, regardless of the order in which the events occurred in the game. Accordingly, the user may specify compilation criteria 306 to indicate that desired priority. Similarly, a user may, for example, not want to see highlights from multiple programs in the order in which the programs were broadcasted, but may want to specify a different ordering of programs and/or highlights. For example, a user may want to see highlights from certain games before highlights from other games. Or, a user may want to see all scoring plays of from all the games before other highlights. The user could specify compilation criteria 306 according to the user's preferences. Without any compilation criteria 306 being specified, a default order for the compilation of highlights could be temporal. Highlights may be ordered according to time of occurrence within a program, with the event occurring earliest in the program being placed first in the compilation, and events occurring subsequently in the program being placed in subsequent order in the compilation. Likewise, sets of highlights from multiple program may be ordered by default according to the order in which the programs were broadcast. In the case of multiple programs being broadcasted simultaneously, the default order could be set according to order in which the first event from each program occurred.

The content handling system 300 may receive one or more content sources 308. For example, certain content sources 308 may be received via transponder stream. One or more additional tuners of the set-top box may be identified that are idle, and the set-top box may assign a tuner of the set-top box to tune to one or more transponder streams. For example, if the set-top box has four tuners, the three tuners not being used to tune to the first television channel may be idle. An idle tuner may be defined as a tuner that is not being used to receive a transponder stream for presentation of a television channel via a presentation device or for recording of a television channel. The availability of audio/video decoding resources may be determined to decode certain content sources 308. For example, referring to set-top box 200 of FIG. 2, the number of audio/video decoder submodules 233 that are idle may be determined. An audio/video decoder submodule may be defined as idle when the audio/video decoder submodule is not being used to decode video and/or audio received from a DVR or descrambling engine.

One or more television channels (other than the first channel already being output for presentation) may be selected based on the event criteria 302 and/or program indication(s) 304. Such information may specify or otherwise indicate one or more television channels. One or more idle tuners may tune to the one or more television channels. In some embodiments, each tuner may tune to a different television channel of the one or more television channels. In some embodiments, a television tuner may tune to multiple channels of the one or more television channels.

The one or more television channels tuned to may be decoded. This decoding may use audio/video decoding resources, which may be implemented in the STB as individual hardware-based audio/video decoding integrated circuits (ICs) or as a single hardware-based audio/video decoding IC which can handle multiple television channels on a time division basis. The audio/video decoders 233 may be used for decoding. Such decoding may involve conversion from an MPEG format to a format appropriate for output to a presentation device and/or a recording device. In some embodiments, received audio/video data may be temporarily buffered and/or decoded for output to allow for processing. Buffering may occur as part of the audio/video decoding process to facilitate trigger handling and/or highlight handling in some embodiments.

Having received the content sources 308, the set-top box 305, via one or more processors 210 and software instructions, may process the content sources 308 to identify triggers that indicate that one or more portions of programs should be recorded and/or marked as highlights 309 of interest to the user, and to record, compile, arrange, edit, and/or store program portions of interest from one or more programs so that one or more compilations of one or more highlights are available for users to view at leisure.

In some embodiments, a trigger handling engine 330 of the content handling system 300 may process the content sources 308 to identify triggers. The trigger handling engine 330 may be configured to examine one or more of various aspects of the content sources 308.

In some embodiments, the set-top box 305 may include a highlight handler engine 350. The highlight handler engine 350 may receive a trigger indication from the trigger handling engine 330 in some embodiments. The trigger indication may be any suitable indicator for the program portion of interest. In some embodiments, the trigger indication may include one or more of time code information, program time information, time stamp information, frame offset/position information, packet identifier information, real-time indicators indicating that the recording should start "now" according to the program stream, flags, and/or any suitable indicators. The highlight handler engine 350, having a trigger indication, may coordinate the recording of a program portion 309 corresponding to the trigger indication. The highlight handler engine 350 may coordinate the recording with DVR 345, which may correspond to DVR 245 of storage medium 225.

In certain embodiments, the entirety of one or more programs of interest may be recorded, and highlights within each program may be marked so that the user may directly skip to one highlight at a time. With this mode, the user has the ability to see more of the recording before or after the event if they want to, up to just deciding to watch the entire event. A program stream may be marked such that one or more highlights in the stream are identified. In some embodiments, the highlight handler engine 350 may mark the highlights in the video sequence in any suitable manner for incorporating associated data into an information stream so that the highlights may be identified by the set-box and navigated to with ease by the user when viewing the program after it has been recorded with the DVR. In some embodiments, the marking include time code information, frame offset information, flags, and/or the like. For example, the portion may be flagged in the video segment, or with metadata associated with the video segment. In some embodiments, the marking may include time code information, frame offset information, flags, and/or any suitable indicators incorporated in the metadata and/or the video stream. Thus, time stamps may be used to indicate where in a program the highlights occur. In some embodiments, the marking may indicate particular frames.

In some embodiments, the highlight handler engine 350 may be configured to check if a program is currently be output for presentation to a display device 360, which may correspond to the television 160. A program currently being output for presentation is an indication of the possibility that one or viewers may be currently viewing the program and the display device 360. If so, a PiP (picture-in-picture) window 356 may be provided via a PIP display module 355 to show a highlight live on any suitable portion of the display screen simultaneously to the program currently being output for presentation. The PIP display module 355 may include processor-executable code that may be run to provide a formatted graphic output to the display device 360. The PIP display module 355 may utilize conventional PIP display methods. The PiP window 356 may automatically pop up on the screen responsive to the trigger received from the trigger handling engine 330. In some embodiments, the PIP display module 355 may cause the highlight to be output for presentation for the extent of the time window specified by the event criteria 302. In some embodiments, the PiP window 356 may automatically disappear from the display screen at the end of the time window. This PIP feature may be provided to a user as a user-selectable option in any suitable manner, as described herein with respect to other user-selectable options.

It should be understood that the functions performed by various modules of the content handling system 300 may be performed using one or more processors. As such, for example, certain functions of the various aspects of the content handling system 300 may be performed by one or more of the processors 210, for example. It should be understood that the modules of the STB 305 may be combined into a smaller number of modules or divided into a greater number of modules.

Figure 4:
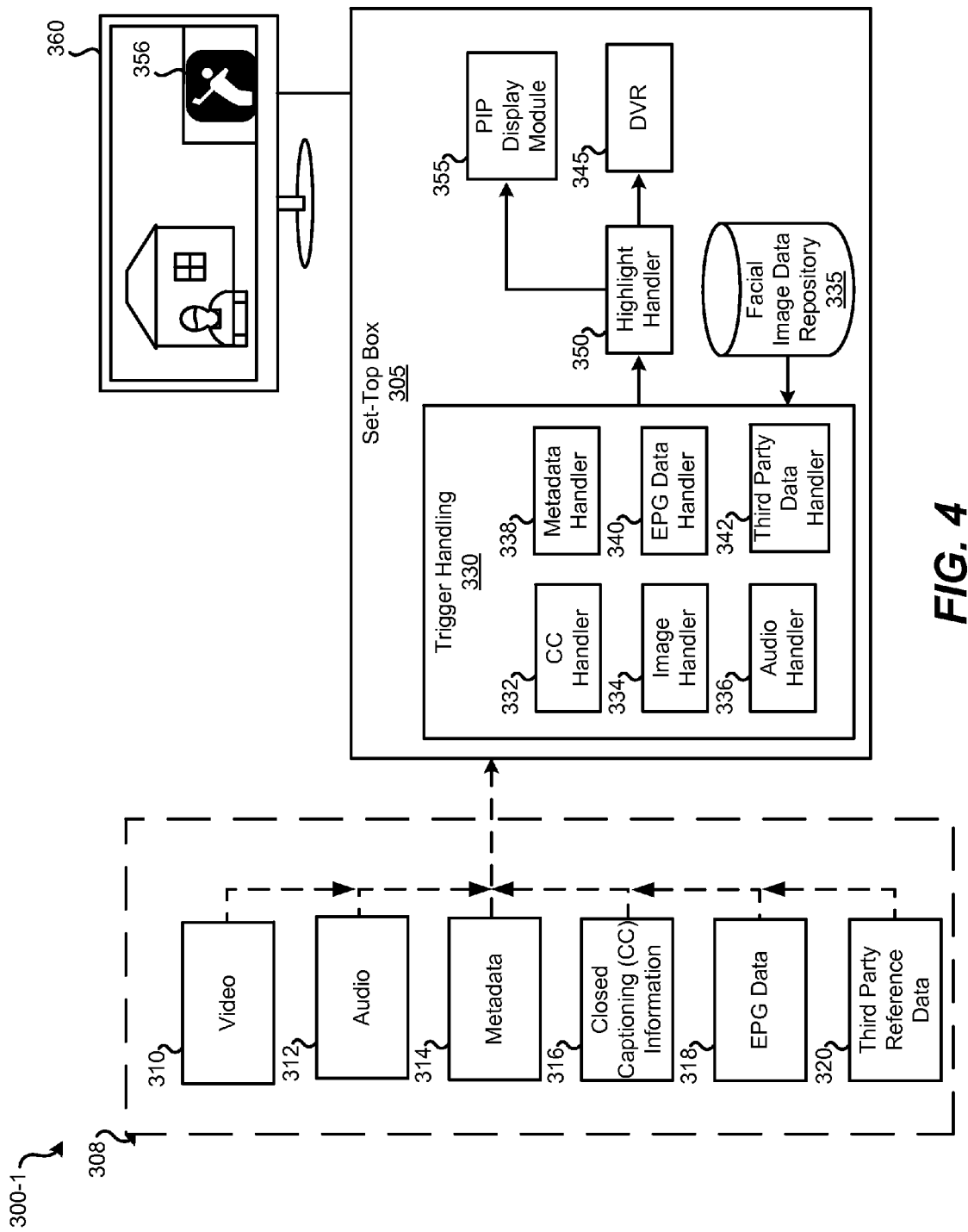
FIG. 4 illustrates a simplified content handling system, in accordance with certain embodiments of the present disclosure.

FIG. 4 is another simplified illustration of a content handling system 300, in accordance with certain embodiments of the present disclosure. The content sources 308 may, without limitation, correspond to a transponder data stream, data contained within data packets of a transponder data stream, audio and/or video data contained within data packets, video tracks, audio tracks, metadata tracks, close captioning information, and/or the like. The content sources 308 may correspond to movies, television programs, portions thereof, etc. In various embodiments, the content sources 308 may be received with one or more of the tuners 215 and/or network interfaces 220. In the example depicted, the content sources 308 may include one or more of video data 310, audio data 312, metadata 314, close captioning information 316, EPG data 318, third party reference data 320, and/or any other suitable content source. Accordingly, in various embodiments, the identification of content of interest may be based at least in part on one or more of video triggers, audio triggers, metadata triggers, closed captioning triggers, EPG data triggers, third and/or the like.

In some embodiments, the trigger handling engine 330 may include a closed captioning (CC) handler engine 332. The closed captioning (CC) handler engine 332 may receive and process the closed captioning information 316. The CC handler engine 332 may search closed captioning information 316 that corresponds to the event criteria 302 and/or program indications 304. The CC handler engine 332 may search the closed captioning information 316 in view of the event criteria 302 to identify corresponding triggers. For example, if a touchdown correspond to an event of interest in a football game, the CC handler engine 332 may search the closed captioning information 316 for the game for instances of the keyword, "touchdown," and possibly other indicators of the event that could be identified via the closed captioning information 316.

In some embodiments, the trigger handling engine 330 may include an image handler engine 334. The image handler engine 334 may receive and process the video data 310. The image handler engine 334 may search the video data 310 that corresponds to the event criteria 302 and/or program indications 304, and search the video data 310 in view of the event criteria 302 to identify corresponding triggers. Some embodiments could employ OCR (optical character recognition) as part of the image handler engine 334. For example, in view of particular event criteria 302, the image handler engine 334 could employ OCR with a known or otherwise predetermined/typical location of video frame data that corresponds to the score changes for a football game. For example, the image handler engine 334 could monitor a lower portion of the video as displayed on screen for score changes.

Some embodiments could employ facial recognition as part of the image handler engine 334. For example, in view of particular event criteria 302, the image handler engine 334 could use facial recognition to monitor the video data 310 for a particular individual that may for example be the host of a television show, and also may make guest appearances on other television shows. In some embodiments, a processor 210 (such as a main processor, a core processor, digital signal processor, and/or like) may perform correlation of images from the video data 310 to reference images in a facial image data repository 335, either local to the set-top box 305, such as in storage medium 225, or in a network-accessible location and available via the network interface 220, for example. Based on the event criteria 302 specifying a particular individual, reference facial data for the request could be obtained from the facial image data repository 335. The facial data could include any suitable facial trait qualifications for the specified individual in any suitable form for correlation with the video stream. In some embodiments, the video stream may be buffered/recorded to allow for measuring of characteristics of the images. In some embodiments, analysis of image characteristics may be on a frame-by-frame basis. In some embodiments, analysis of image characteristics may be based on sampling certain frames. For a given video frame or set of video frames, the video data may be processed to extract facial data from the video. The extracted facial data may be compared to reference facial data.

In some embodiments, the trigger handling engine 330 may include an audio handler engine 336. The audio handler engine 336 may receive and process the audio data 312. The audio handler engine 336 may search the audio data 312 that corresponds to the event criteria 302 and/or program indications 304, and search the audio data 312 in view of the event criteria 302 to identify corresponding triggers. The audio handler engine 336 may employ any suitable audio recognition technology. Some embodiments could employ speech recognition to identify triggers. Some embodiments could use the speech recognition in addition to, or in alternative to, the monitoring of the closed captioning information 316. The speech recognition could be used as a check on the closed captioning information 316 in some embodiments. Some embodiments could employ other types of audio recognition. For example, the audio handler engine 336 could recognize when a certain individual is speaking, or crowd noise levels to detect high levels of excitement, for example, when a crowd at a sporting event "goes wild."

In some embodiments, the trigger handling engine 330 may include a metadata handler engine 338. The metadata handler engine 338 may receive and process the metadata 314. The metadata handler 338 may search the metadata 314 that corresponds to the event criteria 302 and/or program indications 304, and search the metadata 314 in view of the event criteria 302 to identify corresponding triggers. The metadata 314 may contain any suitable information about the content, and the granularity of the metadata 314 may vary greatly with a variety of content and with time. Some embodiments where only high-level metadata 314 is available, the metadata handler engine 338 could use the metadata 314 as a preliminary indication of a particular program of interest, rather than as a direct trigger indication.

In some embodiments, the trigger handling engine 330 may include an EPG data handler engine 340. The EPG data handler engine 340 may receive and process the EPG data 318. In various embodiments, the EPG data 318 may be received via the network interface 220 and/or retrieved from the storage 225. The EPG data handler engine 340 may search the EPG data 318 that corresponds to the event criteria 302 and/or program indications 304, and search the EPG data 318 in view of the event criteria 302 to identify corresponding triggers. The EPG data 318 may contain any suitable information about the content, and the granularity of the EPG data 318 may vary greatly with a variety of content and with time. Some embodiments where only high-level EPG data 318 is available, the EPG data handler engine 340 could use the metadata 314 as a preliminary indication of a particular program of interest, rather than as a direct trigger indication.

In some embodiments, the trigger handling engine 330 may include a third party data handler engine 342. The third party data handler engine 342 may receive and process the third party reference data 320. In some embodiments, the third party reference data 320 could be received via the network interface 220. The third party data handler engine 342 may monitor the third party reference data 320 that corresponds to the event criteria 302 and/or program indications 304, and may search/monitor the third party reference data 320 in view of the event criteria 302 to identify corresponding triggers. For example, the third party reference data 320 could correspond to real-time updates regarding a live football game of interest. The real-time updates could be derived from any suitable source. For example, a scorekeeping service may track score changes for a sporting event and make the score data available in a network-accessible repository. The data could be made available in a network-accessible database, website, or any suitable repository. In some embodiments, the content handling system 300 may pull the data. In some embodiments, the data may be pushed to the content handling system 300. For example, a push notification may be sent from a score tracking service to the content handling system 300 with every score change. In some embodiments, update data, such as data that indicates a score change, may be sent via RSS or any suitable text stream. The third party data handler engine 342 could monitor the updates for triggers.

Accordingly, the set-top box 305 may be configured to detect triggers for program portions of interest. The set-top box 305 may be configured to receive the content 308, analyze the content 308 or certain portions thereof, and determine locations of program portions of interest. Having identified one or more triggers, the set-top box 305 may be configured to the record and/or mark the pertinent program portions based on the one or more triggers.

Figure 5:
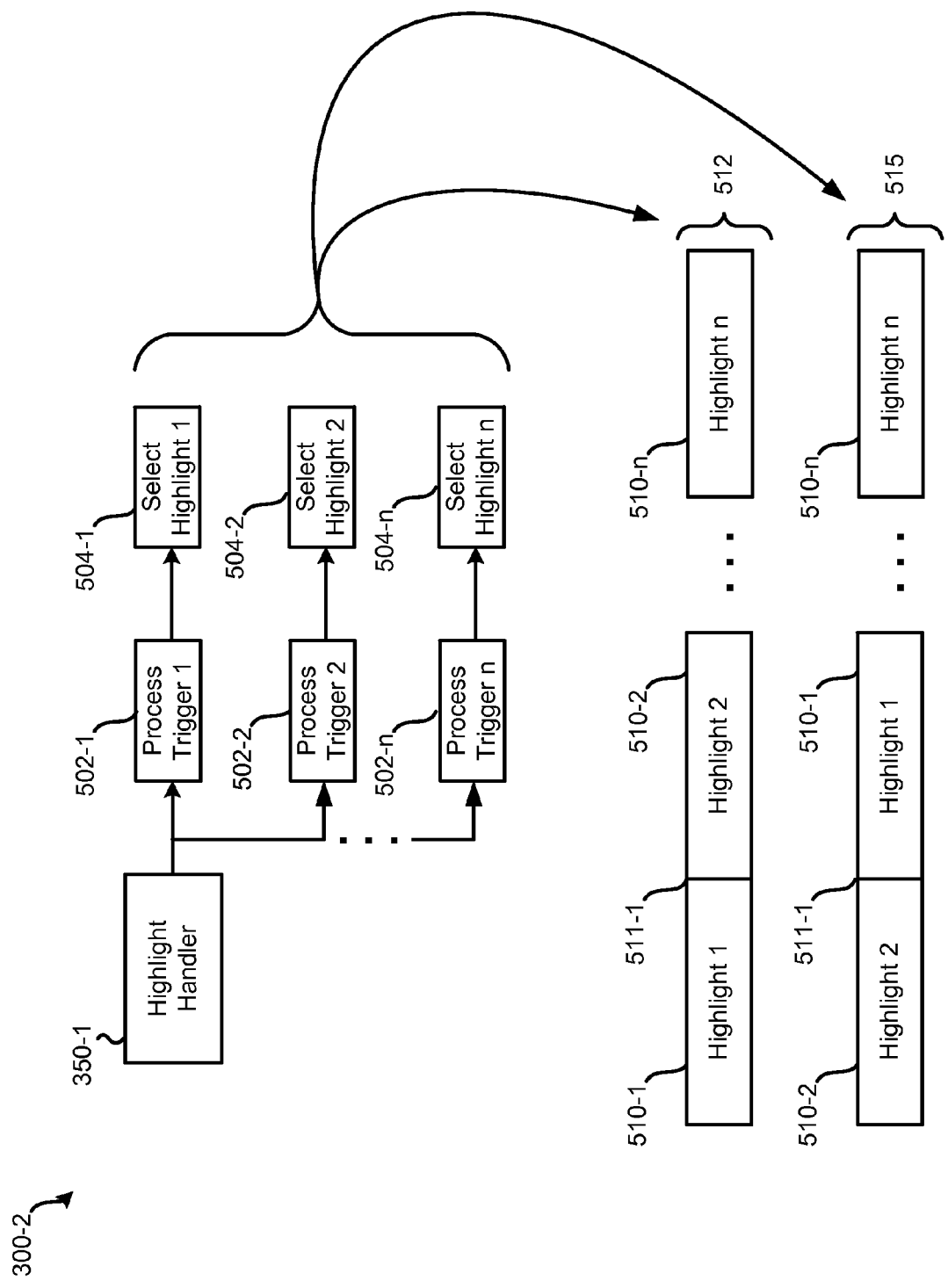
FIG. 5 is a functional illustration of highlight handling, in accordance with certain embodiments of the present disclosure.

FIG. 5 is a functional illustration of highlight handling, in accordance with certain embodiments of the present disclosure. The highlight handler engine 350-1 may process one or more trigger indications 502. The highlight handler engine 350-1 may determine the extent of the slice for the highlight in some embodiments. In some embodiments, a user-specified time window may dictate the extent of the slice. The highlight handler engine 350 could base the extent of the slice on event criteria 302 that may include a time window. Without a time window being specified by the user, the extent of the slice may be based on any suitable default time window. In some embodiments, the extent of the slice may be determined based on another trigger indication that corresponds to the end of program portion of interest. For example, recording of a scoring play may cease when the beginning of the subsequent play is detected.

The highlight handler engine 350-1 may cause the selection 504 of one or more highlights that correspond to program portions of interest. In some embodiments, the selection 504 may correspond to causing the recording of a highlight. In some embodiments, the selection 504 may correspond to causing a copying, extracting, or otherwise segregating a highlight. In some embodiments, the content handling system 300 may be configured to record an entire program of interest or substantial portions thereof, and segregate the pertinent program portions based on the one or more triggers from the larger recording. In some embodiments, the content handling system 300 may be configured to buffer a program of interest until a pertinent program portion is identified based on the one or more triggers. The buffering may allow for the segregation of program programs without recording substantial portions that are not used for highlights.

Recorded highlights 510 may be gathered into a compilation 512. Without any compilation criteria 306 being specified, a default order for the compilation 512 of highlights could be temporal. As depicted in the compilation 512, highlights 510 may be ordered according to time of occurrence within a program, with the event occurring earliest in the program being placed first in the compilation, and events occurring subsequently in the program being placed in subsequent order in the compilation. However, if the user indicated compilation criteria 306 specifying ordering/priority information, an alternative compilation may be formed according to the user's desired priority, as indicated by the compilation 514, where the highlights 510 are not placed according to a temporal or sequential order.

In various embodiments, the highlight handler engine 350-1 may allow for various transitions 511 between the highlights 510. In some embodiments, a transition 511 could be simply the ceasing of highlight and the beginning of another highlight. In some embodiments, a transition 511 could be blank video of any suitable color. In some embodiments, a transition 511 could be a fade-out of one highlight and/or a fade-in to the next highlight.

In some embodiments, a transition 511 could include a description introducing the next highlight, with title, heading, headline, etc. The description could include the program title, time information relating the highlight to the program as a whole, and/or the like. In some embodiments, time information may be indicated during the highlights. For example, a program time could be overlaid on the highlight and/or a progression bar could be overlaid on the highlight.

Figure 6:
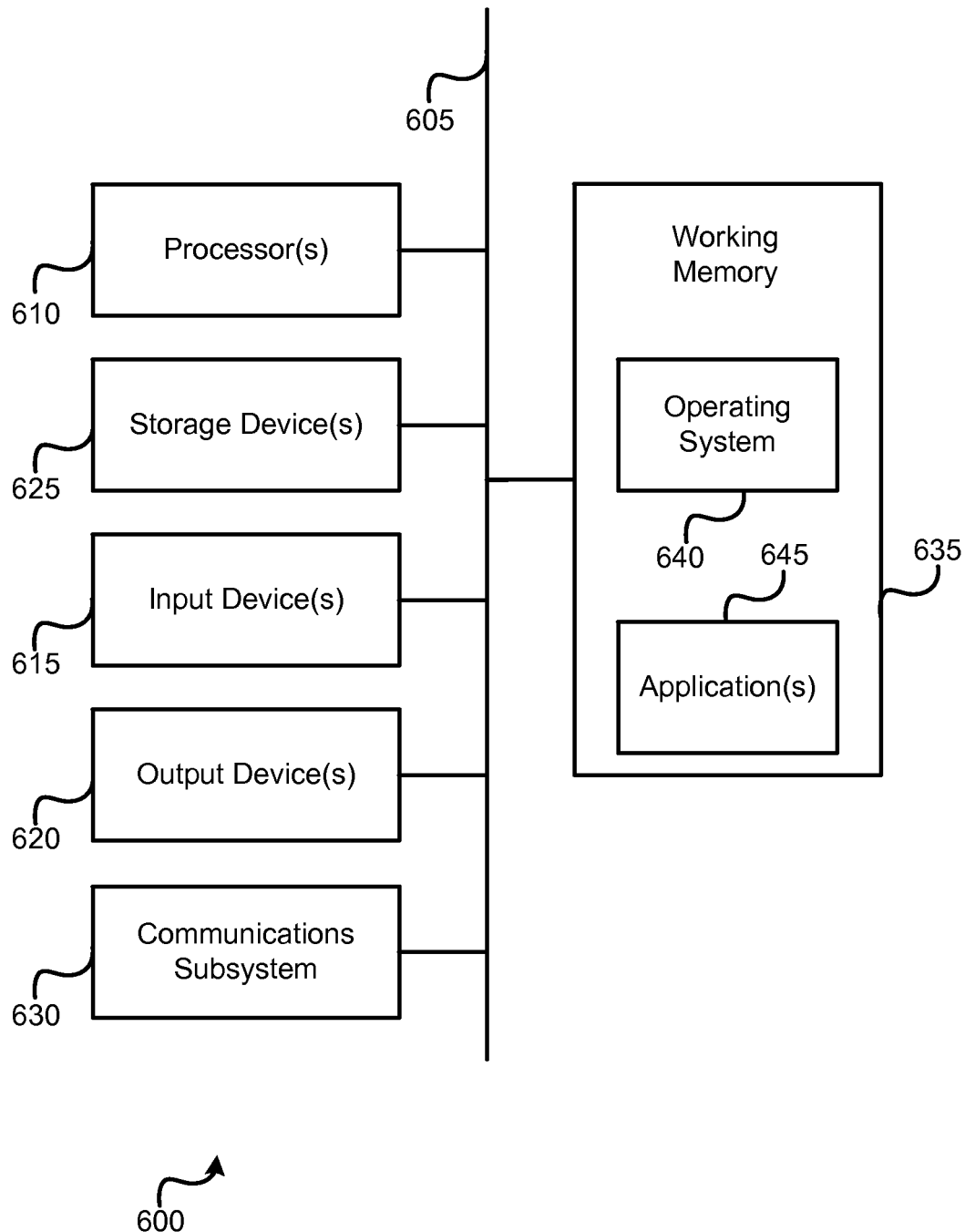
FIG. 6 is a schematic illustration of one embodiment of a computer system that can perform the methods provided by various embodiments, in accordance with certain embodiments of the present disclosure.

A computer system as illustrated in FIG. 6 may be incorporated as part of the previously described devices, such as the content receiver (e.g., set-top box). FIG. 6 provides a schematic illustration of one embodiment of a computer system 600 that can perform the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. In many embodiments, the computer system 600 will further comprise a working memory 635, which can include a RAM or ROM device, as described above.

The computer system 600 might also include a communications subsystem 630, which can include without limitation a modem, a network card (wireless or wired), an infrared communication device, a wireless communication device, and/or a chipset (such as a Bluetooth™ device, an IEEE 802.11/WiFi device, a WiMax device, cellular communication facilities, etc.), and/or the like. The communications subsystem 630 may permit data to be exchanged with a network (such as the network described below, to name one example), other computer systems, and/or any other devices described herein.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. In some embodiments, the entirety of one or more programs of interest may be recorded, and highlights within each program may be marked so that the user may directly skip to one highlight at a time.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A media device configured for content-based highlight handling of television programming, the media device comprising:
   one or more processors; and
   one or more storage devices coupled to the one or more processors and configured to store instructions to cause the one or more processors to:
      receive one or more criteria of interest corresponding to user input, the one or more criteria comprising one or more key words corresponding to user input;
      determine a number of one or more idle tuners of the media device that are not being used to receive any television channels for presentation or recording;
      determine, for each of the one or more idle tuners, at least one program of interest to monitor based on the received criteria of interest, wherein said determining is based on at least one of: a user-selected program type or category, electronic programming guide (EPG) data, or program metadata;
      tune each of the one or more idle tuners to separate television channels corresponding to the determined program of interest to monitor;
      process content received at the media device, the content corresponding to the at least one determined program of interest monitored by the one or more idle tuners, wherein the content comprises both closed-captioning information for the at least one determined program of interest, and audio content for the at least one determined program of interest;
      determine, based at least in part on the one or more criteria of interest, a portion of the content that corresponds to the one or more criteria of interest, wherein determining the portion of the content comprises identifying the presence of at least one of the received key words corresponding to the user input within the portion of the content, said identifying comprising:
         (a) identifying at least one of the key words within the closed-captioning information, and
         (b) initiating an audio recognition process on the portion of the content to verify the presence of at least one of the received key words within the portion of the content; and
      cause a portion of a television program to be recorded, wherein the portion of the television program corresponds to the portion of the content determined based at least in part on the one or more criteria of interest.

2. The media device of claim 1, further comprising receiving update data comprising a score change of a sporting event associated with the content, wherein the portion of the content that corresponds to the one or more criteria of interest is further based on the score change.

3. The media device configured for content-based highlight handling of television programming of claim 1, the instructions further to cause the one or more processors to:
   identify, based at least in part on the one or more criteria of interest, a second portion of the content that corresponds to the one or more criteria of interest; and
   cause a second portion of the television program to be recorded, wherein the second portion of the television program corresponds to the second portion of the content identified based at least in part on the one or more criteria of interest.

4. The media device configured for content-based highlight handling of television programming of claim 3, the instructions further to cause the one or more processors to:
   cause a first recording of the portion of the television program and a second recording of the second portion of the television program to be arranged in a compilation.

5. The media device configured for content-based highlight handling of television programming of claim 4, wherein the arrangement of the first recording of the portion of the television program and the second recording of the second portion of the television program is based at least in part on the one or more criteria of interest.

6. The media device configured for content-based highlight handling of television programming of claim 1, wherein the content comprises at least one of video data, metadata, and third party reference data.

7. The media device configured for content-based highlight handling of television programming of claim 1, the instructions further to cause the one or more processors to:
   responsive to a determination that second content corresponding to a second television program is currently being output for presentation, cause the portion of the television program to be output for presentation in a PiP (picture-in-picture) window.

8. The media device of claim 1, wherein causing a portion of the television program to be recorded comprises:
   recording the television program in its entirety in response to the determination that the television program is a program of interest to monitor, based on the received criteria of interest; and
   modifying a program stream of the record television program by marking the program stream at a first point corresponding to a beginning time of the portion of the content identified and at a second point corresponding to an ending time of the portion of the content identified.

9. The media device of claim 1, the instructions further to cause the one or more processors to:
   in response to determining the portion of the content that corresponds to the one or more criteria of interest:
      determine whether a different television program is currently being output by the media device on a display device;
      in response to determining that a different television program is currently being output by the media device on the display device, automatically initiate a picture-in-picture (PiP) window on the display device; and
      cause the identified portion of the television program to be output for presentation via the PiP window on the display device.

10. The media device of claim 9, the instructions further to cause the one or more processors to:
   automatically close the PiP window on the display device, after outputting the determined portion of the television program.

11. The media device of claim 1,
   wherein determining the portion of the content that corresponds to the one or more criteria of interest comprises:
      comparing the one or more key words corresponding to user input to the closed-captioning information for the at least one determined program of interest to identify the at least one of the key words within the closed-captioning information; and
      in response to identifying the at least one key word within the closed-captioning information, initiating the audio recognition process to verify the key word within the audio content for the at least one determined program of interest.

12. The media device of claim 1,
   wherein determining the portion of the content that corresponds to the one or more criteria of interest comprises:
      initiating the audio recognition process to identify one or more of the key word within the audio content for the at least one determined program of interest; and
      in response to identifying at least one of the key words within the audio content, verifying the identified key words within closed-captioning information.

13. A method for content-based highlight handling of television programming, the method comprising:
   receiving, via a media device, one or more criteria of interest corresponding to user input, the one or more criteria comprising one or more key words corresponding to user input;
   determining, via the media device, a number of one or more idle tuners of the media device that are not being used to receive any television channels for presentation or recording;
   determining, via the media device, for each of the one or more idle tuners, at least one program of interest to monitor based on the received criteria of interest, wherein said determining is based on at least one of: a user-selected program type or category, electronic programming guide (EPG) data, or program metadata;
   tuning each of the one or more idle tuners of the media device to separate television channels corresponding to the determined program of interest to monitor;
   processing, via the media device, content received at the media device, the content corresponding to the at least one determined program of interest monitored by the one or more idle tuners, the content including both closed-captioning information for the at least one determined program of interest, and audio content for the at least one determined program of interest;
   identifying, via the media device and based at least in part on the closed-captioning information for the at least one determined program of interest, a portion of the content that corresponds to the one or more criteria of interest, wherein identifying the portion of the content comprises identifying the presence of at least one of the received key words corresponding to the user input within the portion of the content, said identifying comprising:
      (a) identifying at least one of the key words within the closed-captioning information, and
      (b) initiating an audio recognition process on the portion of the content to verify the presence of at least one of the received key words within the portion of the content; and
   causing, via the media device, a portion of a television program to be recorded, wherein the portion of the television program corresponds to the portion of the content identified based at least in part on the one or more criteria of interest.

14. The method for content-based highlight handling of television programming claim 13, further comprising:
   identifying, based at least in part on the one or more criteria of interest, a second portion of the content that corresponds to the one or more criteria of interest; and
   causing a second portion of the television program to be recorded, wherein the second portion of the television program corresponds to the second portion of the content identified based at least in part on the one or more criteria of interest.

15. The method for content-based highlight handling of television programming claim 13, wherein the content comprises at least one of video data, metadata, and third party reference data.

16. A non-transitory computer-readable medium, having sets of instructions stored thereon which, when executed by a computing system, cause the computing system to:
   receive one or more criteria of interest corresponding to user input, the one or more criteria comprising one or more key words corresponding to user input;
   determine a number of one or more idle tuners of the media device that are not being used to receive any television channels for presentation or recording;
   determine, for each of the one or more idle tuners, at least one program of interest to monitor based on the received criteria of interest, wherein said determining is based on at least one of: a user-selected program type or category, electronic programming guide (EPG) data, or program metadata;
   tune each of the one or more idle tuners to separate television channels corresponding to the determined program of interest to monitor;
   process content received at the media device, the content corresponding to the at least one determined program of interest monitored by the one or more idle tuners, wherein the content comprises both closed-captioning information for the at least one determined program of interest, and audio content for the at least one determined program of interest;
   determine, based at least in part on the one or more criteria of interest, a portion of the content that corresponds to the one or more criteria of interest, wherein determining the portion of the content comprises identifying the presence of at least one of the received key words corresponding to the user input within the portion of the content, said identifying comprising:
      (a) identifying at least one of the key words within the closed-captioning information, and
      (b) initiating an audio recognition process on the portion of the content to verify the presence of at least one of the received key words within the portion of the content; and
   cause a portion of a television program to be recorded, wherein the portion of the television program corresponds to the portion of the content determined based at least in part on the one or more criteria of interest.

17. The computer-readable medium of claim 16, wherein causing a portion of the television program to be recorded comprises:
recording the television program in its entirety in response to the determination that the television program is a program of interest to monitor, based on the received criteria of interest; and
modifying a program stream of the record television program by marking the program stream at a first point corresponding to a beginning time of the portion of the content identified and at a second point corresponding to an ending time of the portion of the content identified.

18. The computer-readable medium of claim 16, having further instructions stored thereon which, when executed by the computing system, cause the computing system to:
in response to determining the portion of the content that corresponds to the one or more criteria of interest:
determine whether a different television program is currently being output by the media device on a display device;
in response to determining that a different television program is currently being output by the media device on the display device, automatically initiate a picture-in-picture (PiP) window on the display device; and
cause the identified portion of the television program to be output for presentation via the PiP window on the display device.

19. The computer-readable medium of claim 18, having further instructions stored thereon which, when executed by the computing system, cause the computing system to:
automatically close the PiP window on the display device, after outputting the determined portion of the television program.

20. The computer-readable medium of claim 16, wherein determining the portion of the content that corresponds to the one or more criteria of interest comprises:
comparing the one or more key words corresponding to user input to the closed-captioning information for the at least one determined program of interest to identify the at least one of the key words within the closed-captioning information; and
in response to identifying the at least one key word within the closed-captioning information, initiating the audio recognition process to verify the key word within the audio content for the at least one determined program of interest.

21. The computer-readable medium of claim 16, wherein determining the portion of the content that corresponds to the one or more criteria of interest comprises:
initiating the audio recognition process to identify one or more of the key word within the audio content for the at least one determined program of interest; and
in response to identifying at least one of the key words within the audio content, verifying the identified key words within closed-captioning information.

* * * * *